United States Patent
Maw

(10) Patent No.: US 9,152,238 B2
(45) Date of Patent: Oct. 6, 2015

(54) ASYMMETRIC SHUFFLE KEYBOARD

(76) Inventor: Wai-Lin Maw, Edmonton (CA)

( * ) Notice: Subject to any disclaimer, the term of this patent is extended or adjusted under 35 U.S.C. 154(b) by 1046 days.

(21) Appl. No.: 12/440,468

(22) PCT Filed: Oct. 25, 2007

(86) PCT No.: PCT/US2007/082513
§ 371 (c)(1),
(2), (4) Date: Mar. 7, 2009

(87) PCT Pub. No.: WO2008/057785
PCT Pub. Date: May 15, 2008

(65) Prior Publication Data
US 2010/0110012 A1 May 6, 2010

Related U.S. Application Data

(60) Provisional application No. 60/857,996, filed on Nov. 8, 2006, provisional application No. 60/877,599, filed on Dec. 29, 2006.

(51) Int. Cl.
*G06F 3/02* (2006.01)
*G06F 1/16* (2006.01)
*G06F 3/0488* (2013.01)
*G06F 3/023* (2006.01)

(52) U.S. Cl.
CPC .............. *G06F 3/0202* (2013.01); *G06F 1/169* (2013.01); *G06F 1/1616* (2013.01); *G06F 1/1622* (2013.01); *G06F 1/1662* (2013.01); *G06F 3/0216* (2013.01); *G06F 3/0238* (2013.01); *G06F 3/04886* (2013.01)

(58) Field of Classification Search
CPC .............. G06F 3/0488; G06F 3/04883; G06F 3/04886; G06F 1/1616; G06F 1/1622; G06F 1/1662; G06F 3/0202; G06F 3/0216; G06F 3/0238; G06F 1/169
USPC .................. 345/156–184, 104; 715/773, 863; 455/575.3; 379/433.13
See application file for complete search history.

(56) References Cited

U.S. PATENT DOCUMENTS

| | | | |
|---|---|---|---|
| 5,579,037 A | 11/1996 | Tahara et al. | |
| 6,073,036 A * | 6/2000 | Heikkinen et al. | 455/550.1 |
| 6,169,538 B1 * | 1/2001 | Nowlan et al. | 345/168 |
| 6,271,835 B1 * | 8/2001 | Hoeksma | 345/168 |
| 7,117,009 B2 * | 10/2006 | Wong et al. | 455/556.1 |
| 7,136,687 B2 * | 11/2006 | Chang | 455/575.3 |

(Continued)

FOREIGN PATENT DOCUMENTS

CN 2745286 Y 12/2005

*Primary Examiner* — Patrick F Marinelli

(57) ABSTRACT

An asymmetric keyboard with a QWERTY style layout comprising a plurality of sparse grids and a plurality of dense grids is provided. A sparse grid is substantially large in size containing large keys with large labels, whereas a dense grid is substantially small in size containing small keys with small labels. All keys are functional but the larger keys in the sparse grid offer greater visibility and operability than the smaller keys in the dense grid. The user makes use of the sparse grid as the primary grid to input data. A swipe across a designated boundary interchanges the key labels between corresponding pairs of keys in the designated sparse and dense grids. On the software-based version, a swipe across another designated boundary compresses or decompresses a corresponding grid. On the hardware-based version, a bi-axial hinge allows the display and the keyboard to rotate around two axes.

1 Claim, 14 Drawing Sheets

(56) References Cited

U.S. PATENT DOCUMENTS

| | | | |
|---|---|---|---|
| 7,286,861 B2 * | 10/2007 | Woo | 455/575.3 |
| 7,346,375 B2 * | 3/2008 | Sato et al. | 455/575.3 |
| 7,372,454 B2 * | 5/2008 | Betts-LaCroix | 345/168 |
| 7,419,099 B2 * | 9/2008 | Lee et al. | 235/472.01 |
| 7,602,378 B2 * | 10/2009 | Kocienda et al. | 345/169 |
| 7,694,231 B2 * | 4/2010 | Kocienda et al. | 715/773 |
| 7,797,026 B2 * | 9/2010 | Lin et al. | 455/575.3 |
| 7,844,050 B2 * | 11/2010 | Hwang et al. | 379/433.13 |
| 2002/0174183 A1 * | 11/2002 | Saeidi | 709/206 |
| 2003/0080945 A1 * | 5/2003 | Betts-LaCroix | 345/168 |
| 2004/0119751 A1 | 6/2004 | Yoshimi et al. | |
| 2005/0020325 A1 | 1/2005 | Enger et al. | |
| 2005/0030292 A1 * | 2/2005 | Diederiks | 345/173 |
| 2005/0071778 A1 | 3/2005 | Tokkonen | |
| 2005/0243069 A1 * | 11/2005 | Yorio et al. | 345/173 |
| 2006/0033723 A1 * | 2/2006 | Maw | 345/173 |
| 2006/0135225 A1 * | 6/2006 | Lin et al. | 455/575.3 |
| 2006/0161846 A1 * | 7/2006 | Van Leeuwen | 715/702 |
| 2006/0190836 A1 | 8/2006 | Ling et al. | |
| 2006/0197753 A1 * | 9/2006 | Hotelling | 345/173 |
| 2008/0024451 A1 * | 1/2008 | Aimi et al. | 345/168 |
| 2008/0096610 A1 | 4/2008 | Shin et al. | |
| 2008/0284744 A1 * | 11/2008 | Park et al. | 345/173 |

\* cited by examiner

ASYMMETRIC SHUFFLE KEYBOARD

CROSS REFERENCE TO RELATED APPLICATIONS

This application claims the benefits of provisional applications U.S. 60/857,996 filed Nov. 8, 2006 and U.S. 60/877,599 filed Dec. 29, 2006, and is related to regular application U.S. Ser. No. 11/194,788 filed Aug. 1, 2005, and international application PCT/US2005/027272 filed Aug. 1, 2005.

BACKGROUND

The most commonly recognized keyboard from its inception to this day is the QWERTY keyboard. With the advancements in technology, it becomes easier to manufacture portable computing devices varying in size, and the most recognized keyboard just seems to be a logical choice for an input device.

In general, as a device gets smaller, it becomes more portable, however, less practical to incorporate a keyboard with a QWERTY layout. Various approaches have been attempted to incorporate the standard QWERTY style keyboard, a keyboard layout similar to the standard QWERTY keyboard layout, into portable computing devices including palm held devices, devices small enough to fit into a person's palm.

Portable computing devices generally fall into two categories: those that incorporate an onscreen keyboard, a keyboard displayed on a touch screen where the input is directed to a designated program, and those that incorporate a physical keyboard.

The category with an onscreen keyboard ranges from tablet PCs, personal computers with a touch screen, to mobile phones. Since the majority of the portable computing devices that rely on an onscreen keyboard are smaller than the typical full-size QWERTY keyboard at the widest dimension, the user typically has to rely on a stylus to be able to precisely select a key on the relatively smaller onscreen keyboard. Despite this limitation, however, the onscreen keyboard layouts have remained relatively unchanged to this day.

The category with a physical keyboard ranges from notebook computers to PDAs (personal digital assistants). It appears that more attempts have been made in this category.

One approach is to use miniaturization to incorporate a QWERTY style keyboard into portable computing devices, however, with a tradeoff in operability. While there are several approaches taken to improve the operability of miniaturized keyboards, such as modifying the shape and orientation of the keys as in U.S. Pat. No. 7,227,536 Griffin et al, or staggering the keys as in U.S. Pat. No. 7,220,069 Griffin et al, they still don't free them from their inherited fundamental deficiency, miniaturization.

Miniaturized physical keyboards clearly suffer from proportionally scaling down the full-size QWERTY keyboards. The QWERTY keyboard, which is designed for two-handed use, is practical only above a certain size: The keyboard can be scaled down proportionally, but the user's hands cannot be, at least without a considerable amount of difficulty. Therefore, the physical keyboards, when miniaturized, are essentially reduced to "two-thumbed" use, where they are only practical for typing with a person's thumbs. Accordingly, they have become to be known as "thumb-pads."

Perhaps, the most glaring deficiency of miniaturized physical keyboards on portable computing devices is highlighted by the common practice of incorporating typing assistant software, which predicts the next letter or series of letters the user would type, saving the user from having to find and press another miniaturized key.

Another approach is to make the keyboard extendable by use of extension panels as in U.S. Pat. No. 7,206,616 Choi, U.S. Pat. No. 7,221,560 Varela, U.S. Pat. No. 6,707,664 Murphy, U.S. Pat. No. 6,111,527 Susel, and U.S. Pat. No. 5,187,644 Crisan. Some designs have the extension panels rotate out, while others either flip up or pull out. While some of these approaches offer a keyboard nearly as big as a full-size QWERTY keyboard, they are not only bulky and complicated, but also result in serious limitations when applying to palm held devices.

The keyboards with extension panels installed on notebook computers can offer key sizes comparable to a full-size QWERTY keyboard, but the ones installed on palm held devices end up having keys closer in size to miniaturized keys, due to the physical limitation imposed on the extension panels by the folded size of the palm held device. In general, the portability of a device is inversely proportional to each additional unit of mass, and the added bulk of the extension panels clearly reduce the portability of a device.

While it looks like an acceptable solution for notebook computers, it doesn't appear to be widely adopted in the industry, probably due to their added bulk, if not weight.

Yet another approach is to use elastic material, or scissor linkages or alike to hold the individual keys to make the whole keyboard expandable and compressible as in U.S. Pat. No. 5,141,343 Roylance et al., U.S. Pat. No. 5,951,178 Lim, U.S. Pat. No. 6,092,944 Butler, U.S. Pat. No. 7,030,323 Lahr, U.S. Pat. No. 6,882,336 Lahr, U.S. Pat. No. 6,830,397 Lahr, U.S. Pat. No. 6,810,119 Lahr, and U.S. Pat. No. 6,739,774 Lahr. While one approach claims to change the size of the key, in essence it is only giving the perception of a larger key surface area by use of foam or rubber like materials, or a fragmented key surface. These approaches allow changing the spacing between the keys, but despite the variations portrayed in the prior art, the effective core surface area of the keys remain more or less the same.

There are several deficiencies inherent to this approach. Not only the materials would be difficult to manufacture and maintain, but also the wear and tear would make its operability susceptible to failure. It would also be very difficult, if not impossible, to manufacture scaled down components of this nature to fit into a palm held device. Even if that is possible and the added mass isn't an issue, its reliability and durability would be highly questionable.

All of these approaches suffer from proportionally scaling down the layout of the full-size QWERTY keyboard and reducing the size of the keys to fit the entire keyboard into a limited surface area. Having a keyboard intended for use with both hands in environments where it is only practical to use one hand results in an inefficient use of the available space. Moreover, it becomes impractical to use the scaled down keyboard due to the substantially small size of the keycaps. A stylus can be used to manipulate the scaled down onscreen keyboard. However, in the majority of cases, holding, using and keeping track of a stylus in such environments can quickly become a burden.

Objects

The primary object of this invention is to provide large keys on a QWERTY style keyboard incorporated into portable computing devices while meeting the conflicting demands of portability and ease-of-use.

Another object is to factor in the realization that portable computing devices are mostly operated in a one-handed manner, for having to carry it by the other hand, or due to limited access in confined spaces, and optimize the usage of the limited space available for a keyboard on a portable device.

Yet another object is to have a compact and low maintenance QWERTY style keyboard that is free of a total dependency on miniaturization, extension panels, elastic bands, or complex linkages, on portable computing devices.

The final object is to deliver a clean design of a QWERTY style keyboard, ideal to be incorporated into portable computing devices for travelers, mobile businesses, and emergency response and law enforcement parties.

ADVANTAGES

Portable computing devices call for conflicting and competing demands where all things being equal, portability is inversely and ease-of-use is directly proportional to its size.

Most of the portable computing devices are used only by one hand, yet more precisely by one digit (one finger), while the other hand is used to hold it up. Moreover, in the majority of cases, the keyboard is used only to write short phrases. The proportionally scaled down QWERTY keyboard, onscreen or physical, designed for two-handed use results in an inefficient use of the limited space available on portable computing devices.

The small keys make it even harder to press when the user is wearing protective gear such as a glove, which makes the contact point of a digit larger than normal, or see with reduced visibility when the user is wearing a facemask, in hazardous environments.

The proposed invention takes these factors into account and had the QWERTY style layout of the keyboard reorganized to make use of the limited space more efficiently. In contrast to the traditional symmetric layout where the two halves of the keyboard are of comparable sizes and densities, the basic design reorganizes the keyboard into an asymmetric layout where the left and right halves of the keyboard are of different sizes and densities. The key labels are arranged so that those in the dense grid region are substantially small and those in the sparse grid region are substantially large. Alternatively, the top and bottom halves of the keyboard can be arranged in a similar manner, or a combination of both to have more than one dense grid region.

The asymmetry of the keyboard layout results in a sparse grid region containing keys with a keycap area substantially large enough to be operated with ease by a person's fingertips, and is designated as the primary grid for operating the keyboard. The key assignments are shuffled, or swapped, between the dense and sparse grid regions by a simple swipe across a designated border at the user's discretion. The other key groups in the dense grid regions with substantially smaller keys and labels are functional, but less convenient to operate than the primary group of keys in the sparse grid region. However, they serve as a visual clue positioned in the user's peripheral vision aiding one to retrieve from memory the position of a key on the familiar QWERTY keyboard.

For devices comparable in size to an average PDA, it offers large keys that a user can comfortably see with their naked eyes and select with a digit under normal circumstances. Not only this approach allows a more natural typing style, but it also eliminates the need for any artificial assistance such as a stylus or typing assistance software.

For devices substantially larger in size than a PDA, it offers relatively large keycap areas that make it easier to see while wearing a mask, and operated with a fingertip while wearing protective gear.

The proposed solution not only is free from the burden of additional bulk, weight, complexity, or total dependency on miniaturization, but also offers keys that are actually large. The only mechanical components are the pushbuttons, which are widely and reliably used in many of the palm held devices on the market. It, in fact, can be built without the pushbuttons. The majority of the parts are commonly available electronic components that are proven to be highly reliable and durable in their applications in an extensive range and types of portable computing devices.

The proposed solution offers a compact, lightweight and reliable design that meets the conflicting and competing demands of portability and ease-of-use imposed on portable computing devices.

SUMMARY

The QWERTY style keyboard is, perhaps, the most widely recognized keyboard. Portable computing devices call for conflicting and competing demands of portability and operability, and incorporating QWERTY style keyboards into portable computing devices have been fraught with a multitude of challenges.

The QWERTY style keyboards incorporated into portable computing devices generally falls into two categories: onscreen or virtual keyboards, and physical keyboards.

The onscreen keyboard layouts have remained relatively unchanged. However, they are typically small enough that the user has to resort to using a stylus.

While there are several approaches taken to improve the physical keyboards, they are usually based upon miniaturized keys, extension panels, or elastic backings. They all suffer from proportionally scaling down the layout of the full-size QWERTY keyboard, and due to the burden of additional bulk, weight, complexity, or total dependency on miniaturization, their operability, reliability and durability is questionable.

The proposed invention takes into consideration that most of the portable computing devices are used only by one hand, and in the majority of cases, the keyboard is used only to write short phrases. It departs from the trend of emulating the keyboard layout designed for two-handed-use, and employs a reusable space design, offering a keyboard layout designed specifically for one-handed-use.

An asymmetric keyboard with a QWERTY style layout comprising a number of sparse and dense grids defined in a medium, such as a touch pad or a touch screen, is provided. A sparse grid is substantially large in size containing large keys and labels, and a dense grid is the opposite. All of the keys are functional, however, the larger keys in the sparse grid offer greater visibility and operability than the smaller keys in the dense grid. The user makes use of the sparse grid as the primary grid to input data, while the dense grid remains in the user's peripheral vision acting as a clue to the other side of the familiar QWERTY keyboard layout. An effortless and intuitive shuffling motion, a swipe across a designated common boundary between the sparse and dense grids, interchanges the key labels between the corresponding pairs of keys in the designated sparse and dense grids.

The proposed design also allows the user to compress and uncompress a corresponding area of the onscreen keyboard with a simple swiping motion across a designated border. The keycap regions and designated borders are automatically reconfigured to match the change in the compression levels of the grids they are associated with.

The result is a design that offers a compact, lightweight and reliable device that meets the conflicting and competing demands of portable computing devices.

DRAWINGS

List of Figures

Figure 5:
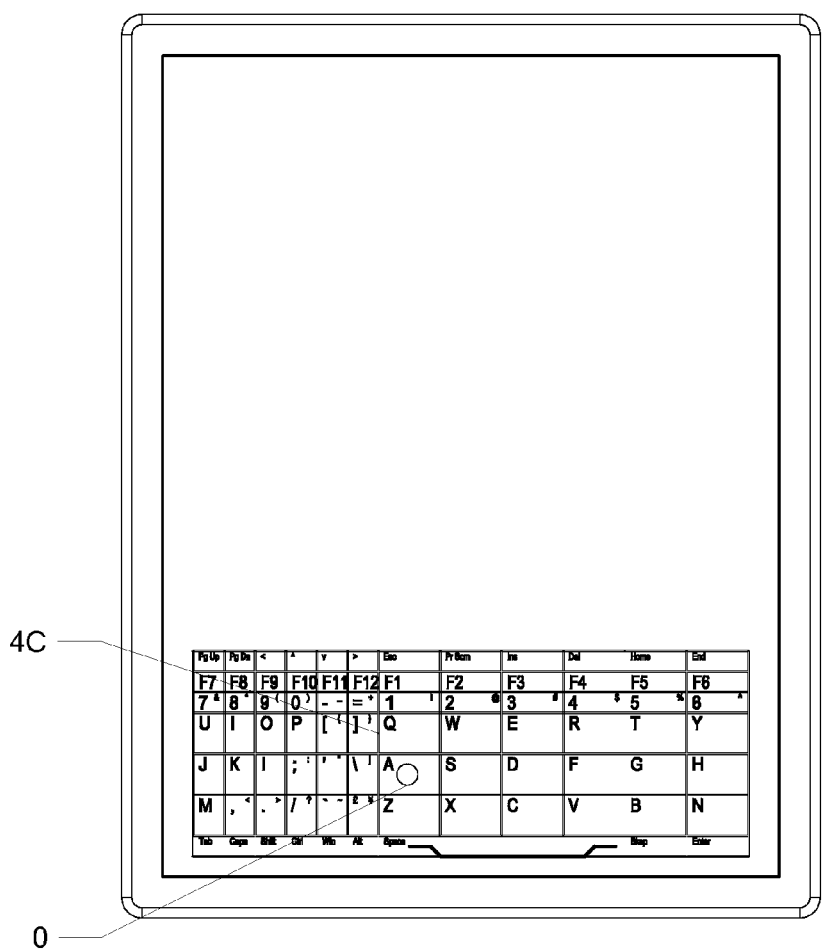
Figure 6:
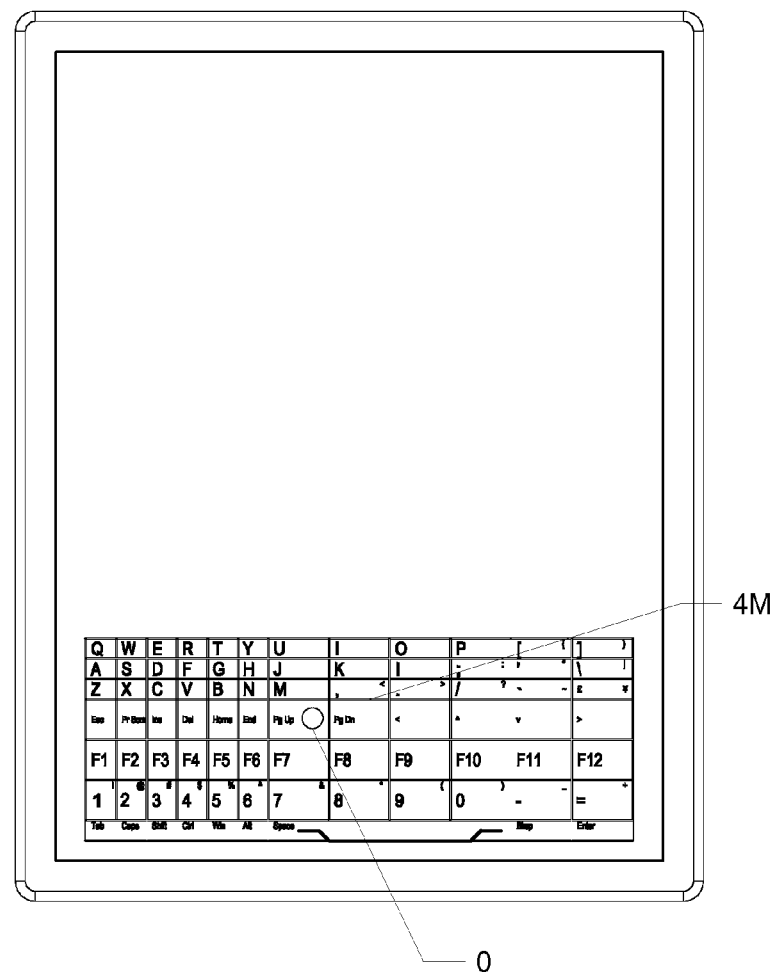
Figure 7:
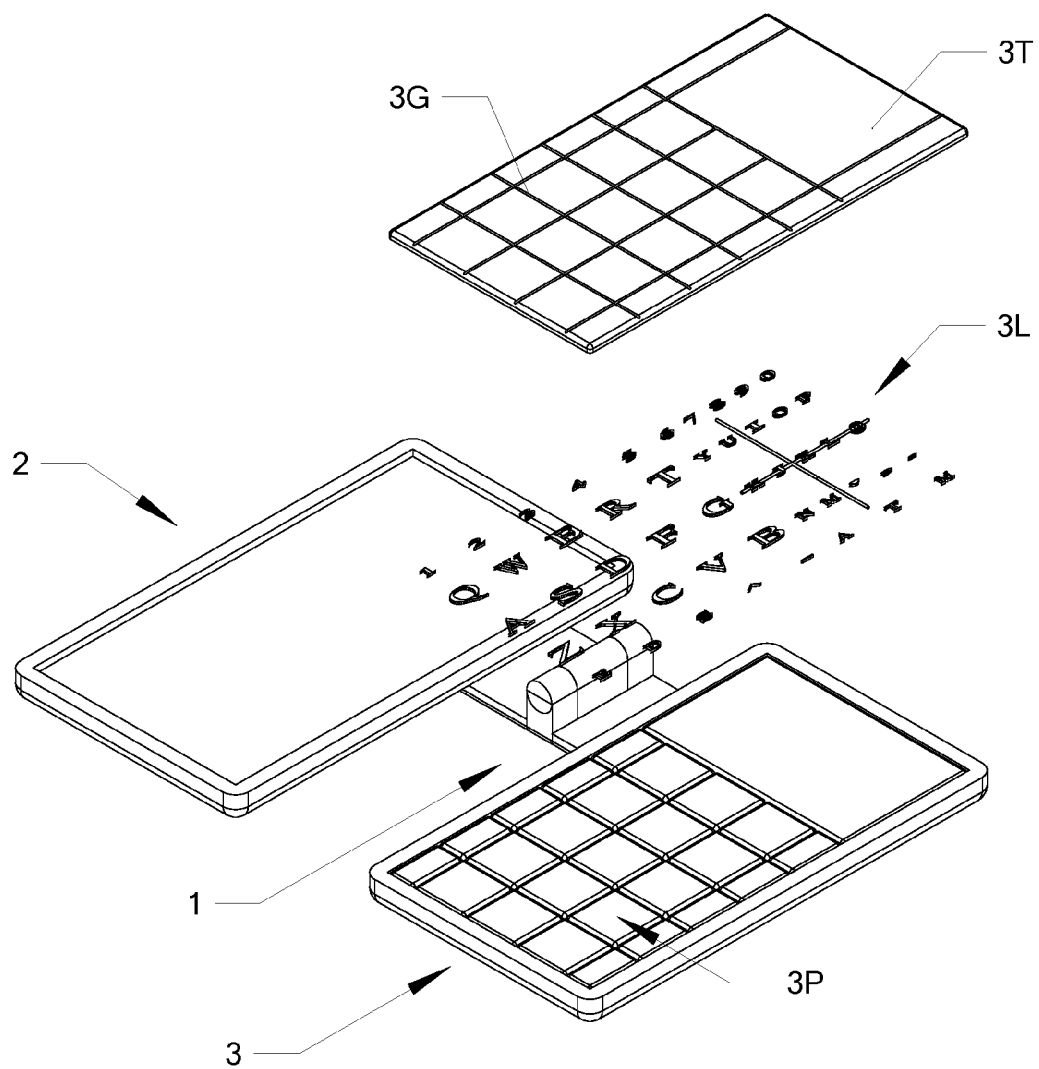
Figure 8:
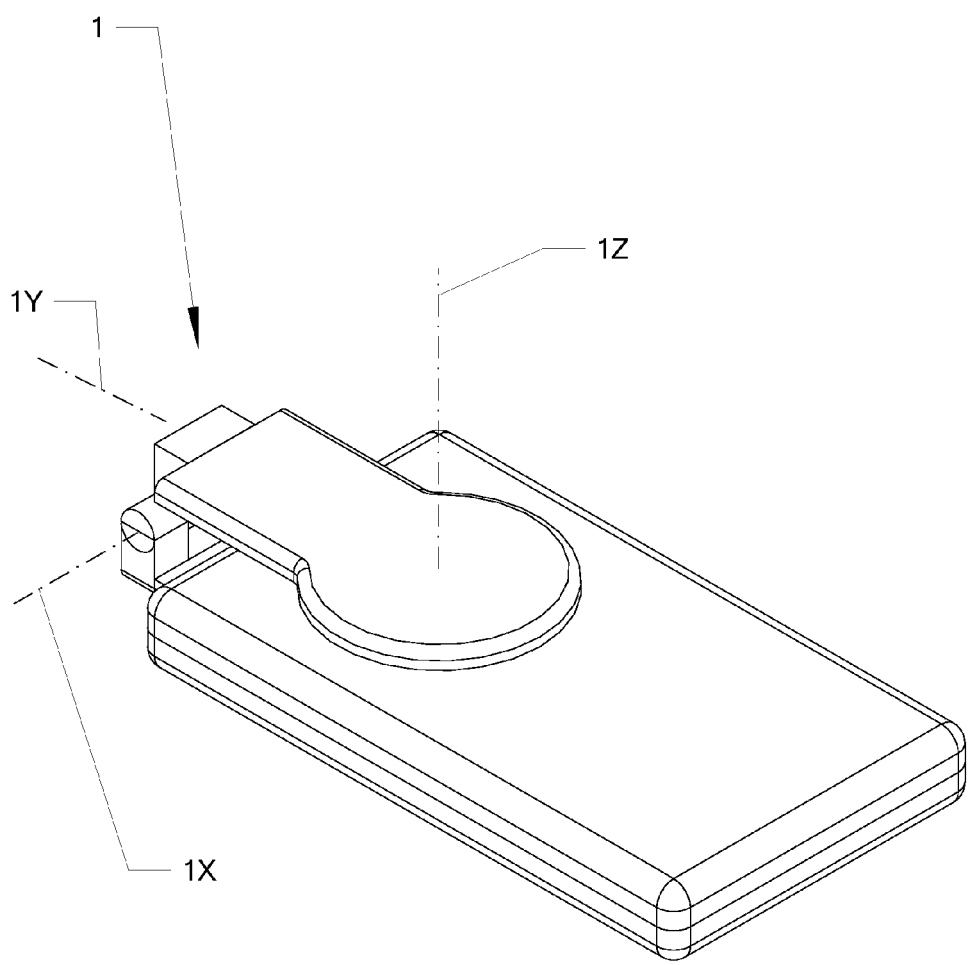
Figure 9:
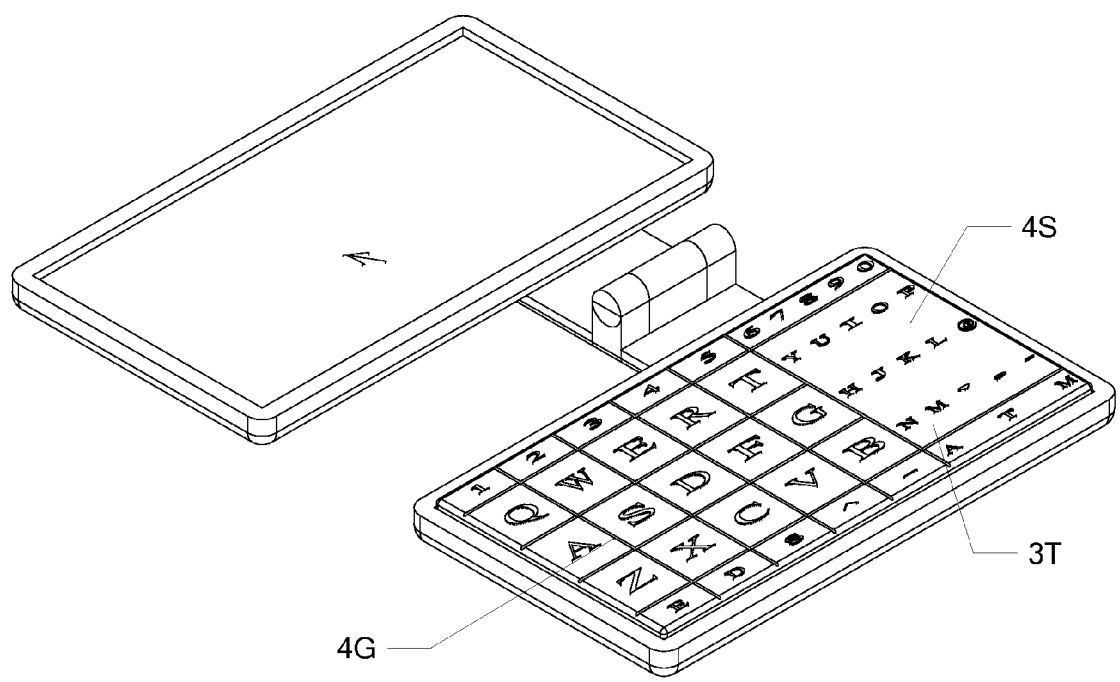
Figure 10:
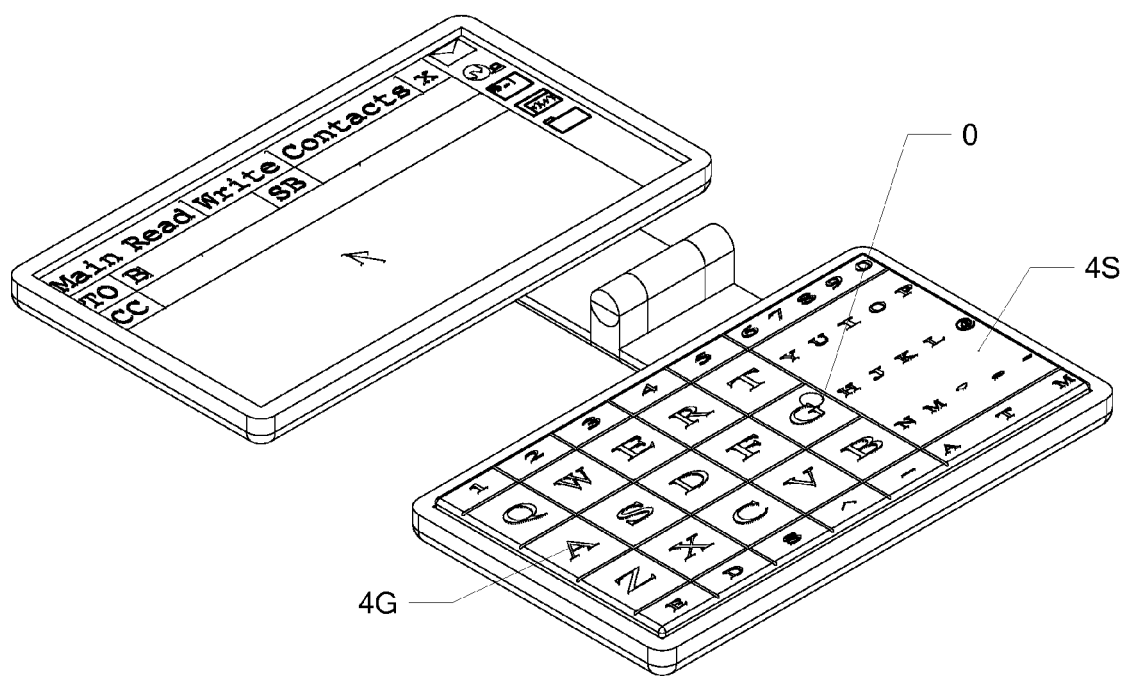
Figure 11:
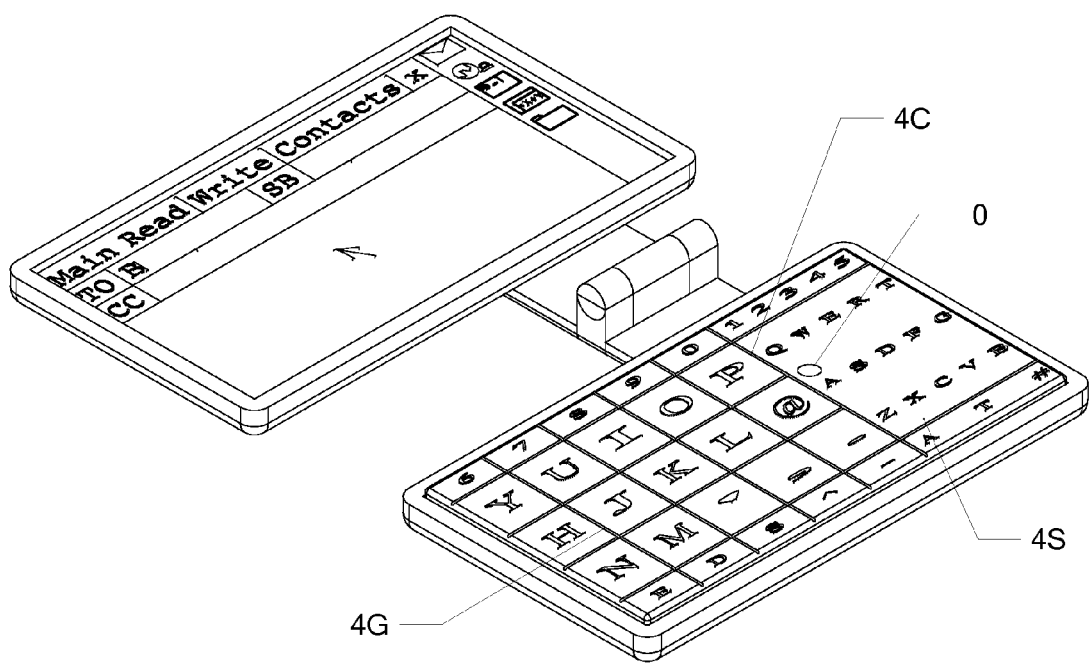
Figure 12:
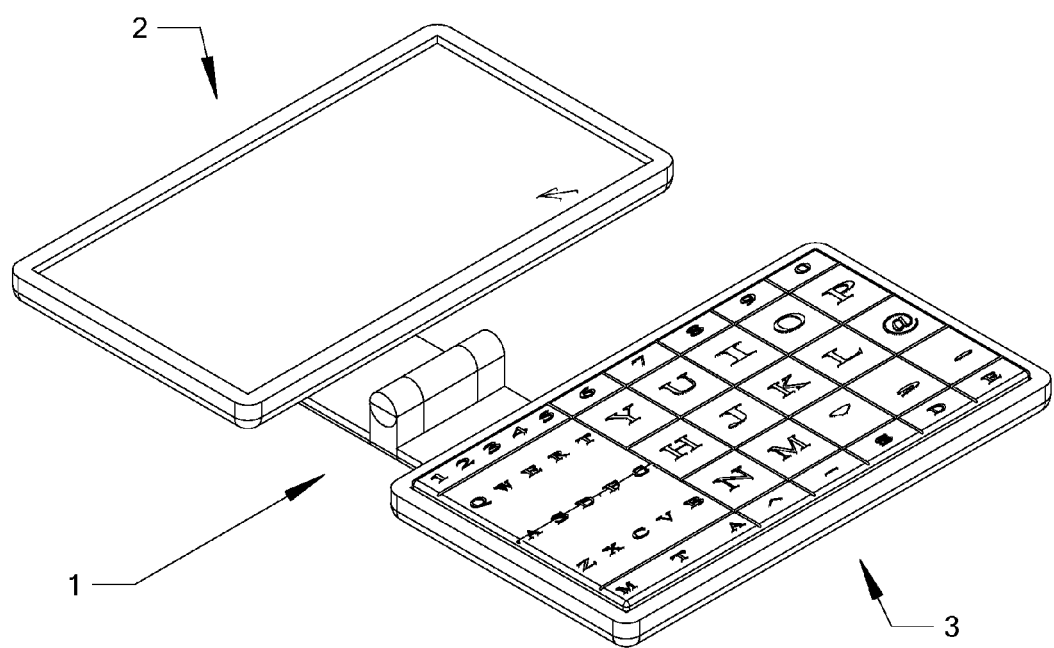
Figure 13:
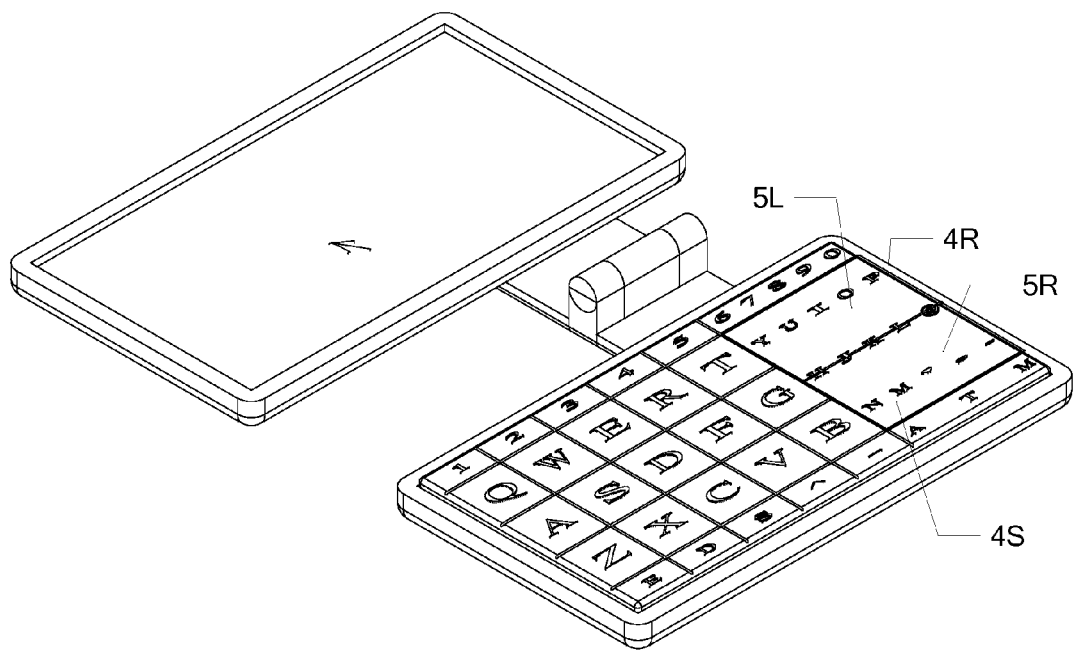
Figure 14:
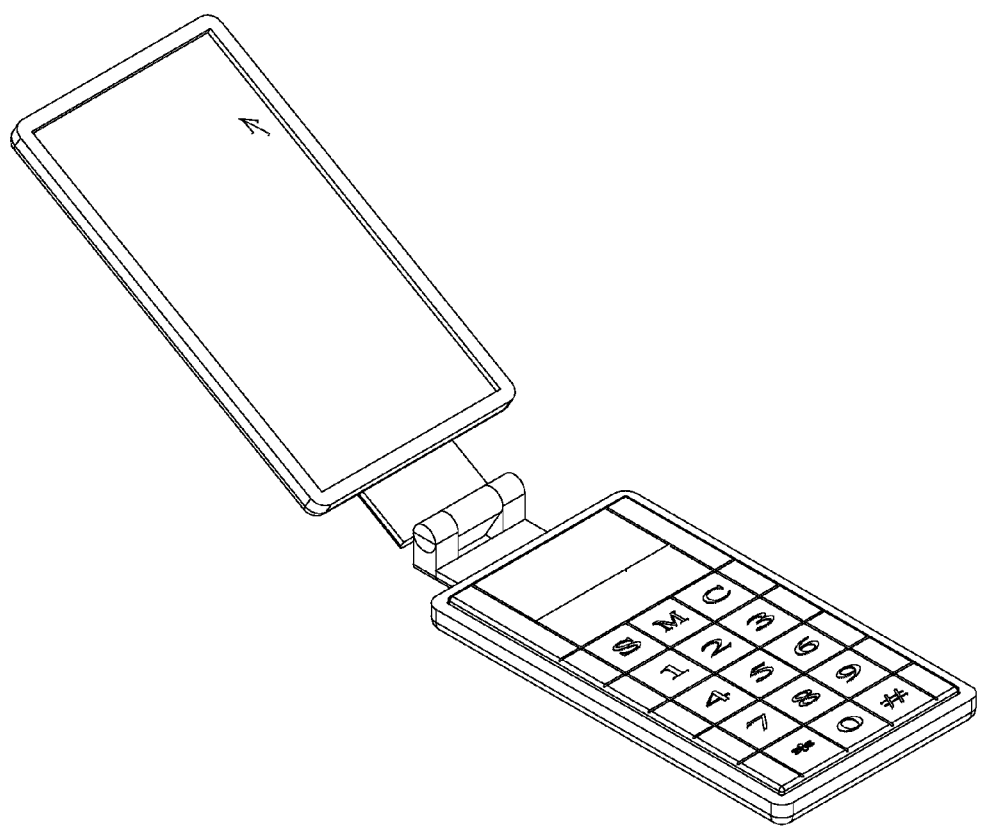

FIG. 5 is the onscreen keyboard with the left and right halves swapped after a horizontal shuffle FIG. 6 is the onscreen keyboard with the top and bottom halves swapped after a vertical shuffle FIG. 7 is the structure of the physical keyboard FIG. 8 is the structure of the bi-axial hinge system FIG. 9 is the operational layout FIG. 10 is the system in CHAR mode FIG. 11 is the system with the left and right halves of the keyboard swapped after a horizontal shuffle FIG. 12 is the system with the two halves of the body rotated to the right side of the hinge assembly FIG. 13 is the system in POINT mode FIG. 14 is the system in 12-KEY mode

DRAWINGS

List of Reference Numerals

0 Contact point
1 Bi-axial hinge
1X X axis of local coordinate system
1Y Y axis of local coordinate system
1Z Z axis of local coordinate system
2 Display
3 Keyboard
3G Grid
3L Light emitting diode (LED) assembly
3P Pushbuttons
3S Touch screen
3T Touch pad
4C Designated center border
4G Grid halve
4L Designated left border
4M Designated middle border
4R Designated right border
4S Slab halve
4T Designated top border
5L Mouse left
5R Mouse right

DESCRIPTION

Preferred Embodiment

Figure 1:
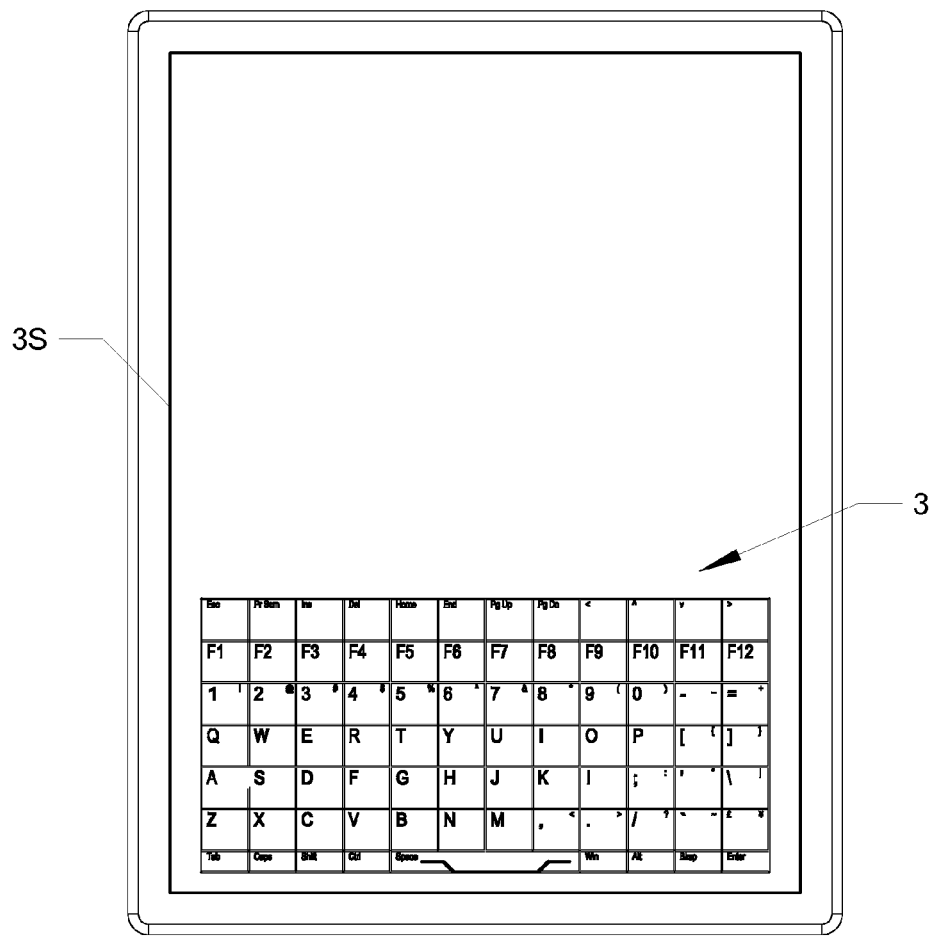
FIG. 1 is the structure of the onscreen keyboard

FIG. 1 shows the structure of the system, where keyboard 3 is displayed as an onscreen keyboard on the touch screen 3S of a tablet PC. Sub-systems including a software component (not shown) manage the operational aspects of the system. The keyboard is in the uncompressed state.

Operation

Preferred Embodiment

Figure 2:
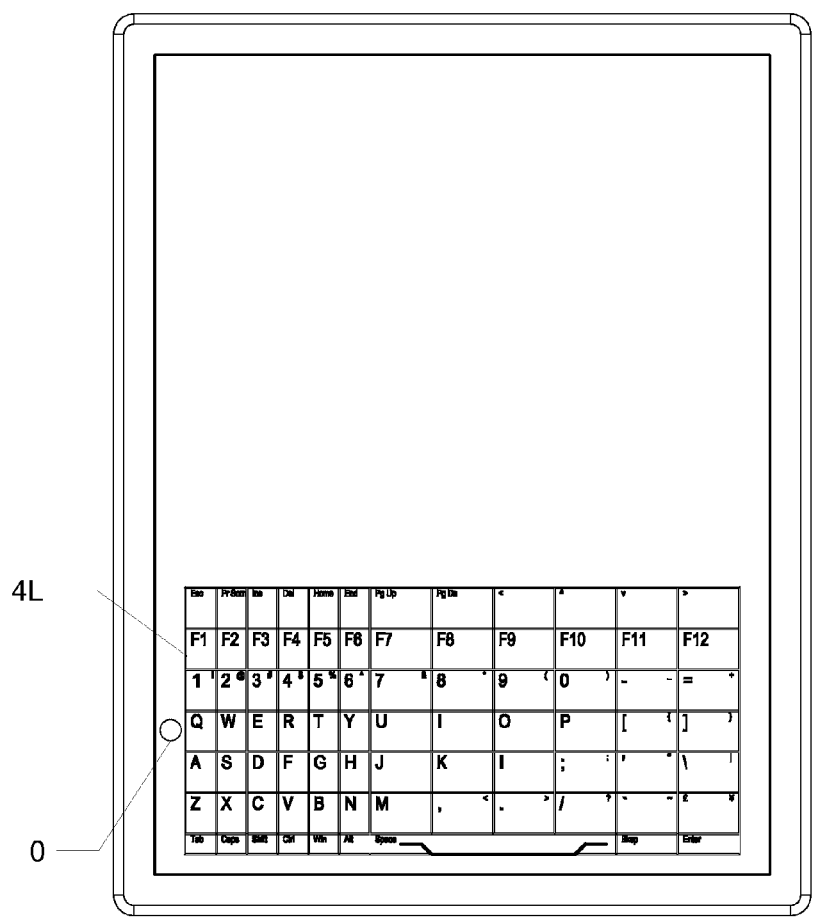
FIG. 2 is the onscreen keyboard with the left side compressed

FIG. 2 shows the system after the left side of the keyboard is compressed after the user makes a swipe, moving the contact point 0 across the designated left border 4L. The borders of the individual regions defining the keycap areas and the designated borders are also reconfigured according to the compressed state of the keyboard. Repeating the swiping motion brings the left side of the keyboard back to the uncompressed state.

Figure 3:
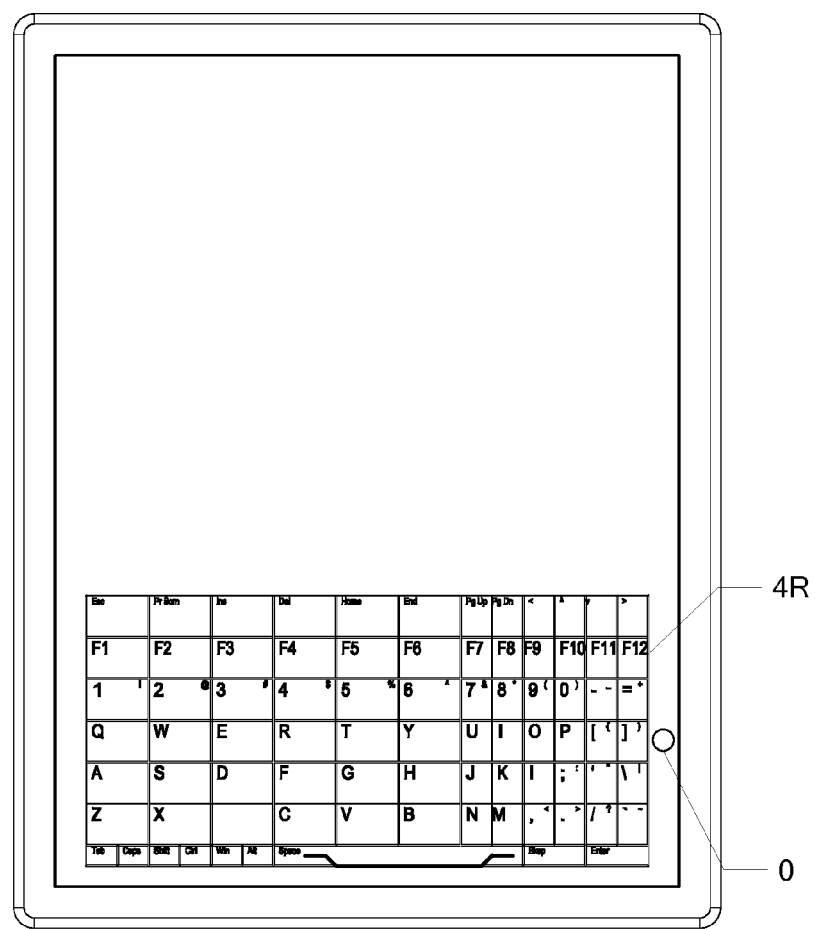
FIG. 3 is the onscreen keyboard with the right side compressed

FIG. 3 shows the system after the right side of the keyboard is compressed after the user makes a swipe, moving the contact point 0 across the designated right border 4R, from the state of the system shown in FIG. 2. In the system illustrated, the left side of the keyboard is automatically uncompressed.

Figure 4:
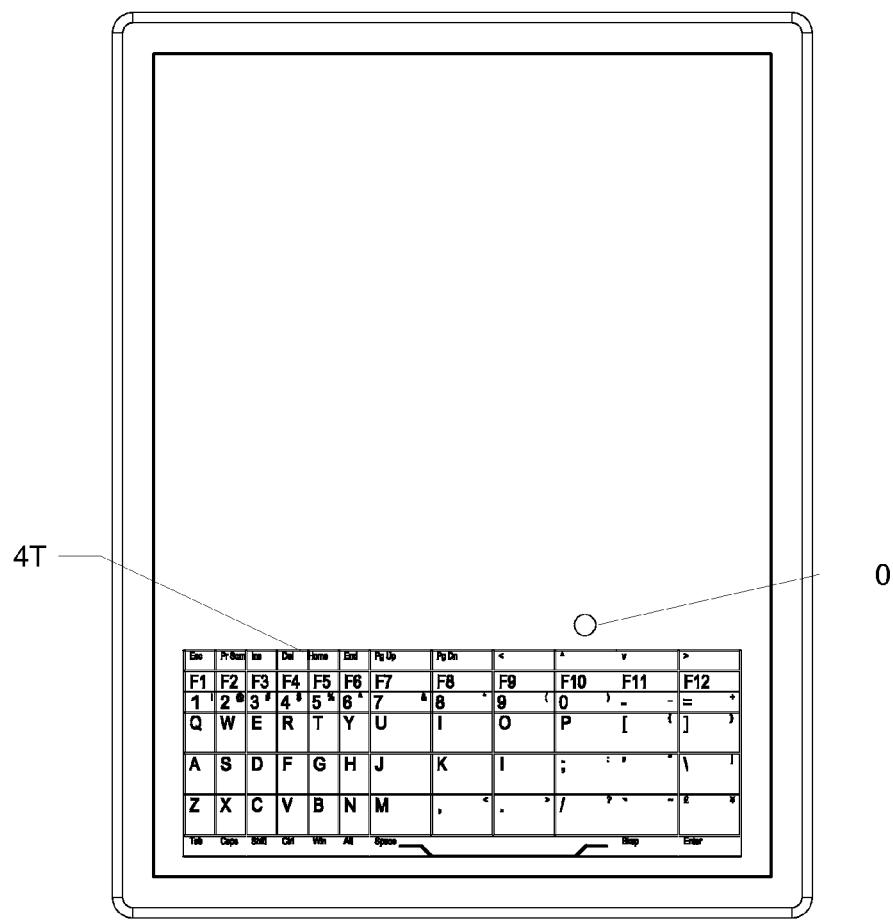
FIG. 4 is the onscreen keyboard with the top side compressed

FIG. 4 shows the system after the topside of the keyboard is compressed after the user makes a swipe, moving the contact point 0 across the designated top border 4T, from the state of the system shown in FIG. 2.

FIG. 5 shows the system after the left and right halves of the keyboard are shuffled, or swapped, after the user makes a swipe, moving the contact point 0 across the designated center border 4C.

FIG. 6 shows the system after the top and bottom halves of the keyboard are shuffled, or swapped, after the user makes a swipe, moving the contact point 0 across the designated middle border 4M.

Description

Alternative Embodiment

FIG. 7 shows the structure of the system, where a keyboard 3 comprising a bed of pushbuttons 3P and a light emitting diode (LED) assembly 3L are placed under a flexible transparent or translucent touch pad 3T with a visible or tactile grid 3G. A hinge assembly 1 holds the two halves, display 2 and keyboard 3, together. A software component (not shown) controls the operational aspects of the system. In addition to controlling the basic features, the software component (not shown) allows configuring the system to treat a tap and a click on touch pad 3T the same or differently, wherein a tap is a touchdown and liftoff of the contact point that does not activate a push button underneath, whereas a click does.

FIG. 8 shows the structure of the bi-axial hinge assembly 1 where axis 1X is positioned in line with the X-axis and axis 1Z is positioned in line with the Z-axis of the standard three dimensional coordinate system with X, Y and Z axes.

Operation

Alternative Embodiment

FIG. 9 shows the operational layout of the system. The surface of the touch pad 3T is divided into a grid halve 4G and a slab halve 4S. The grid halve 4G has a tactile or visible grid as shown in FIG. 7, whereas the slab halve 4S, which also doubles as a pointing device, does not. The system can be set to function in CHAR, POINT, or 12-KEY modes. More than one mode can be active at the same time depending on the state of the system.

FIG. 10 shows the system in CHAR mode where the QWERT halve of the keys are located on the grid halve 4G and the other halve YUIOP is located on the slab halve 4S. Both halves of the keypad can be used for data input, but the grid halve 4G with well defined grids and larger key labels is far more convenient to use than the slab halve 4S, hence would be primarily used for data input. The contact point 0, is located in the grid halve 4G at this stage.

FIG. 11 shows the system after the left and right halves of the keyboard are shuffled, or swapped. The key labels on the slab halve 4S and the grid halve 4G are exchanged by a swipe, moving the contact point 0 across the designated center border 4C. The YUIOP halve is now located on the grid halve 4G and the QWERT halve on the slab halve 4S. The contact point 0 is now located in the slab halve 4S.

FIG. 12 shows the system with display 2 and keyboard 3 rotated to the right side of the hinge assembly 1.

FIG. 13 shows the system in POINT mode. A swipe across the designated right border 4R, or an alternative means, toggles the pointing device mode of the slab halve 4S, turning it on in this scenario. While key labels are still displayed on the slab halve 4S, it no longer functions as a keyboard. It now functions as a touch pad pointing device where sliding across the surface of slab halve 4S is interpreted as a signal to move the pointer, and a tap or a click, depending on the configuration of the system, on the regions 5L and 5R are interpreted as left and right mouse clicks respectively.

FIG. 14 shows the system in 12-KEY mode.

CONCLUSION, RAMIFICATIONS AND SCOPE OF INVENTION

The reader will see that the present invention providing a QWERTY style keyboard with large letters on a palm held device, is a preferable alternative to competing approaches employing miniaturization, extension panels or elastic materials. It offers a compact and a reliable design that meets not only the competing, but also the conflicting demands of portability and practicality, imposed upon portable computing devices.

While the embodiments illustrated rely on small and large labels respectively for substantially obscure and evident representations of a letter, alternative mapping schemes can also be applied. For example, a compact symbol to an elaborate symbol, an acronym to a fully expanded description, or a sign to a worded description, for mapping abbreviated to descriptive marks of a core attribute.

The basic principles applied on visual mediums as illustrated in the embodiments, can be easily extended to tactile mediums as well. For example, an asymmetric keyboard with keys incorporating a pinhead array surface similar to a dot-matrix print head where the individual pinheads can be raised or lowered to create a Braille lettering system.

The task of tracking groups of keys in different regions can be made easier by displaying them with a certain shade that migrates together with them as they are being shuffled from one region to another. This would aid the user to recognize them at a glance, similar to how the audience recognizes players of different soccer teams by their uniforms as they move around the field. Different colors, backgrounds, hatchings, styles, or other markings can also be used to achieve a similar effect.

While the above description contains many specifications, these should not be construed as a limitation of the scope of the invention, but rather as an exemplification of a few embodiments thereof.

What is claimed is:

1. An input device comprising:
   a) A touch-screen;
   b) A processor, a software and hardware subsystem in communication with the touch-screen;
   c) a set of instructions defined within said processor, wherein the set of instructions is configured to:
   d) display, on the touch-screen, a contact point and a keyboard comprising of a major region, that comprises of a plurality of major keys, and a minor region, that comprises of a plurality of minor keys;
   e) mark each of the plurality of major keys with a major symbol; and
   f) mark each of the plurality of minor keys with a minor symbol;
   g) wherein the keyboard is defined within a designated boundary;
   h) wherein a location of the first region and a location of the second region on the keyboard is based on a location of the contact point;
   i) wherein movement of the contact point causes the location of the first region to interchange with the location of the second region and the location of the second region to interchange with the location of the first region based on the movement and location of the contact point;
   j) wherein each major key has a corresponding minor key;
   k) wherein the major symbol, of each major key, is larger and identical to the minor symbol of its corresponding minor key after the interchange; and
   l) wherein the location of the second region is at an opposite location in the designated boundary compared to the location of the contact point with respect to the designated boundary.

\* \* \* \* \*